United States Patent [19]

Pendleton

[11] 4,413,832
[45] Nov. 8, 1983

[54] BODY SLED

[76] Inventor: James E. Pendleton, 5705 SW 187th Pl., Aloha, Oreg. 97007

[21] Appl. No.: 322,743

[22] Filed: Nov. 19, 1981

[51] Int. Cl.³ ............................................. B62B 13/02
[52] U.S. Cl. .................................... 280/12 R; 280/28
[58] Field of Search ................. 280/12 R, 809, 15, 16, 280/18, 19, 28; 441/65, 68

[56] References Cited

U.S. PATENT DOCUMENTS

| | | | |
|---|---|---|---|
| 3,140,878 | 7/1964 | Davis | 280/18 |
| 3,156,483 | 11/1964 | See | 280/18 X |
| 3,484,801 | 12/1969 | Carlin | 280/18 |
| 3,689,092 | 9/1972 | Lake | 280/809 X |
| 3,714,921 | 2/1973 | Gibson | 441/65 X |
| 4,300,759 | 11/1981 | Caplan | 273/DIG. 30 X |

Primary Examiner—Joseph F. Peters, Jr.
Assistant Examiner—Michael Mar
Attorney, Agent, or Firm—Wells, St. John & Roberts

[57] ABSTRACT

A snow sled to be worn on the rider's body, the sled comprising forearm control runners for steering and braking, a chest plate, and thigh runners. Also provided is an adjustable apron between the chestplate and the thigh runners. Stability during operation is obtained by the rider assuming a prone position having a low center of gravity. Grooved ski edges on the sled's working surface increase sled stability and maneuverability.

10 Claims, 7 Drawing Figures

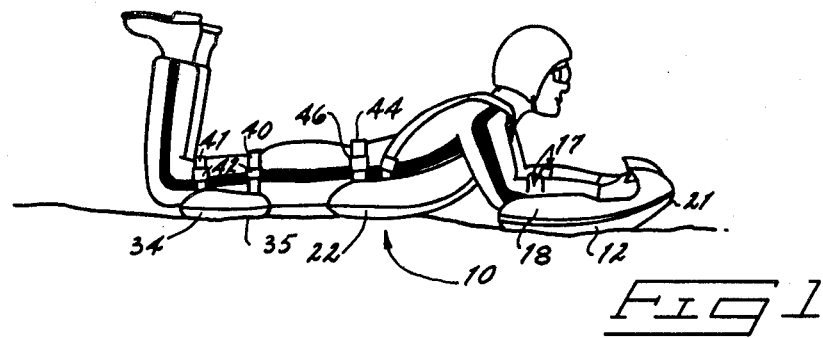
FIG 1
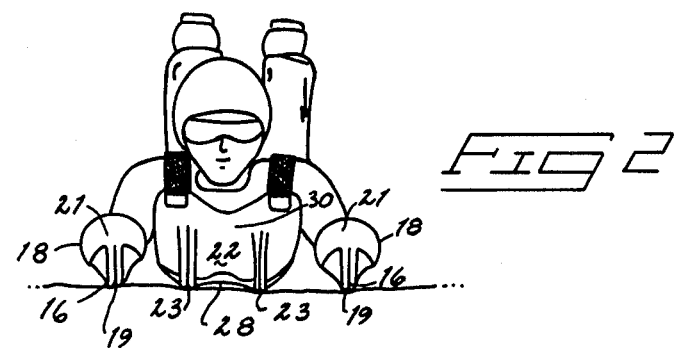
FIG 2
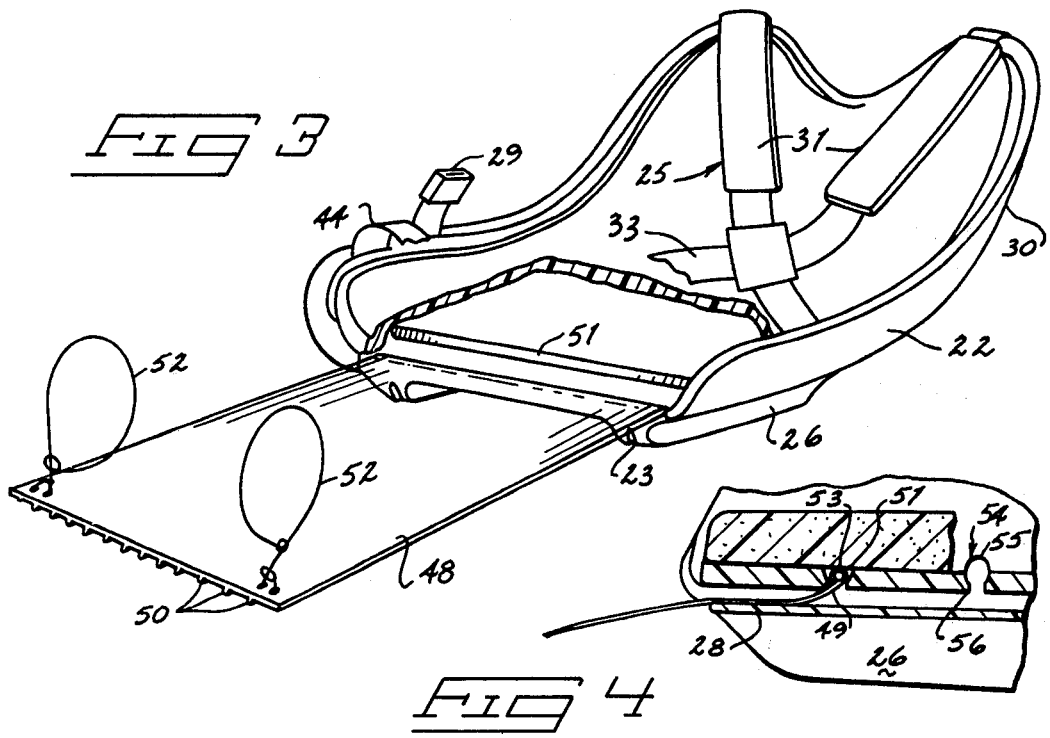
FIG 3
FIG 4

BODY SLED

TECHNICAL FIELD

My invention relates to snow sleds and more particularly, to a sled worn on the body of the rider.

BACKGROUND ART

Prior sled designs allowed the rider little, if any, control over the sled's direction of travel or the speed at which the sled traveled. Although sleds have taken many forms, most are basically of one piece construction upon which the user rides. Control of the sled depends upon a shift in the rider's body weight or a bend in the runners to produce a steering effect. When the sled comes to a stop at the bottom of a slope, the rider has to get off the sled and walk back up the slope, dragging the sled by means of a rope or the like. If the rider is thrown, knocked off, or falls off the sled, the sled could travel down the slope unattended possibly causing damage to property, injury to bystanders and damage to the sled.

Examples of prior sled devices are illustrated in the E. A. Carlin U.S. Pat. No. 3,484,801 and the T. E. Davis U.S. Pat. No. 3,140,878. Both prior art patents describe roll-up flexible toboggans on which the rider sits or lays. The rider holds onto these sleds or toboggans by means of a rope or handholds. The sleds or toboggans provide no means for controlling direction or stopping. The rider of these sleds is at the mercy of the grade and contour of the slope and must "hang on" or "let go" for dear life.

Also worthy of mention is the "Snow Device" illustrated in U.S. Pat. 3,689,092 issued to Gary F. Lake. Although the Lake device may appear at first glance to have a few similar features of my invention, it is basically very different and has many disadvantages when compared to my body sled. The ski-like members of the Lake patent that attach to the rider's legs and feet are the base for the main portion of the rider's body weight. Such ski-like members are not fastened to each other. This results in instability and makes the Lake invention incapable of providing a controllable, stable base for the rider's body weight when being used over rough and uneven surfaces. Such instability promotes frequent rider upsets that could lead to serious injury to the rider and damage to the equipment.

By using hand-held ski-like members in conjunction with the leg ski-like members, the Lake invention provides the rider with a four point stance. The four point stance is not stable because the position of the rider's body is a kneeling position that places a large portion of the rider's weight above his lower legs. This apportionment of rider weight results in a high center of gravity and an unstable balance. The four points of the stance are held by the rider's limbs away from the rider's torso; the ski-like members are not connected to each other, rather they are independent in motion. The four independent points of the stance, when combined with the high center of gravity, exacerbates the instability problem. The Lake device also lacks a positive steering quality due to the flat ski surface of its hand-held ski-like members.

In contrast, my invention provides a guiding edge for cutting into the snow to affect control. The stance of the Lake sled does not apportion sufficient body weight to the hand-held ski-like members for steering control. My invention does provide correct body weight distribution to achieve a controlled and accurate turning or steering quality.

In use, the Lake ski-like members tend to skim over the surface of the snow in one direction no matter what direction the rider turns them, rather than cutting into the snow and making the sled turn (as would the guiding edge of my invention). To effect a turn with the Lake device, the rider must shift his weight from the members attached to his legs to the hand-held ski-like members. This shift reduces tracking necessary to complete the turn.

Thus, the difficulty of maintaining balance, steering, braking and the high center of gravity lessen the usefulness of the Lake sled.

It is an object of my invention to provide a sled worn on the rider's body that provides a safe, comfortable sledding position, and that further provides effective speed and direction control.

Various other objects and advantages will become apparent upon reading the following description, which, when taken with the accompanying drawings, describe a preferred form of my invention. It is to be noted, however, that the following description and drawings are given merely to set forth the preferred form of my invention and that alterations may be made within the scope of the appended claims. Therefore, only the claims are to be taken as specific definitions of what I claim to be my invention.

DISCLOSURE OF INVENTION

My invention provides a body sled. The body sled consists of forearm control runners to be worn on the forearms of a rider. A chest plate is provided to be worn over the chest of the rider. An apron extends from the chest plate to the thighs. Thigh runners are worn about the thighs. Means for attaching the forearm control runners, chest plate, and thigh runners to the body are also provided.

BRIEF DESCRIPTION OF THE DRAWINGS

A preferred embodiment of the invention is illustrated in the accompanying drawings, in which:

FIG. 1 is a side view of the body sled in use;
FIG. 2 is a front view of the body sled in use;
FIG. 3 is an isometric view of the chest plate;
FIG. 4 is a sectional view of the apron adjusting means.

DETAILED DESCRIPTION OF A PREFERRED EMBODIMENT

Figure 5:
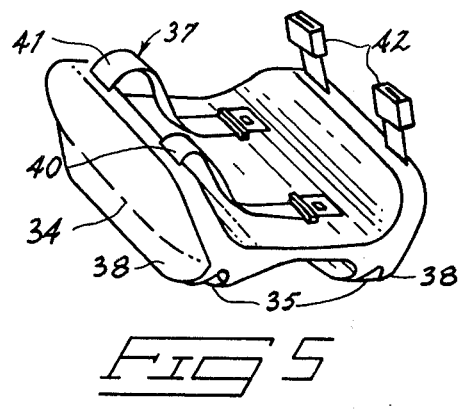
FIG. 5 is an isometric view of the thigh runner.

My invention is a body sled 10 (FIG. 1). In a preferred embodiment, the body sled has six basic components: two forearm control runners, a chest plate, two thigh runners, and an apron. The body sled 10 is worn on the rider's body to provide a unique sledding experience.

The rigid forearm control runners 12 are worn on the rider's forearms to provide a forward snow-contact surface and provide protection of the rider's arms. The forearm control runners 12 have a sled surface 16 extending the length of the forearm. They also have sides 18 extending parallel to the length of the runners 12 for turning the sled in response to exertion of upper forearm pressure by the rider. The sides 18 also provide protection to the rider's arms.

A handgrip 20 (FIG. 7) extends upwardly from the sled surface 16 of the forearm runners 12. The handgrip 20 increases rider control of the forearm control runners 12. A hand guard 21 is located in front of the handgrip 20 to protect the rider's hands while gripping the handgrip 20. The forearm control runners 12 are held to the rider's forearm by strapping means 17 that include an adjustable strap 15 and a strap fastener 13.

Figure 7:
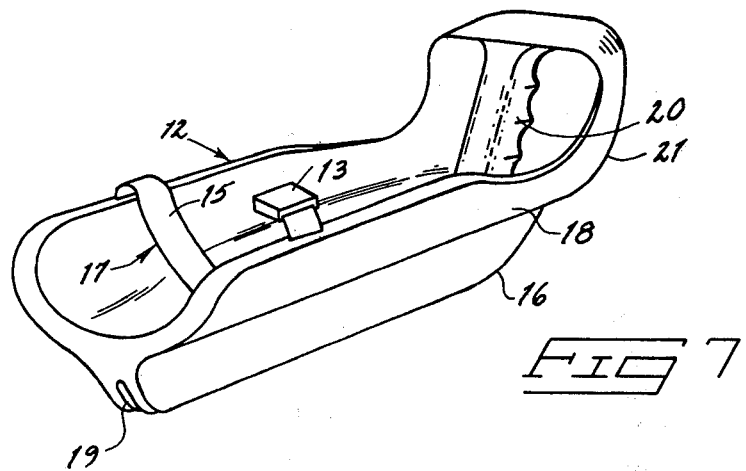
FIG. 7 is an isometric view of the forearm runner.

The sled surface 16 of the forearm control runners 12 provides elongated, longitudinal guiding edges 19, such as the grooved ski elements shown in FIGS. 2 and 7. The guiding edges 19 cut into the snow as the sled 10 moves along the surface of the snow. Grooving or channeling the edges 19 results in greater edge/snow contact. Such contact improves the cutting effect of the edges 19 increasing sled stability and maneuverability.

A rigid chest plate 22 having a sled surface 26 extends the length of the rider's torso. The chest plate 22 has a flat base portion 28 covering the rider's abdomen and a curved portion 30 extending upward over the rider's chest. The contour of the chest plate 22 creates a cavity conforming to the front upper torso of the body to protect the rider's shoulders, chest, and abdomen from injury. The chest plate 22 is curved upward at its sides to protect the rider's sides and to provide a sledding surface when turning or banking. The chest plate 22 is padded for a more comfortable ride.

The chest plate 22 has guiding edges 23, such as grooved ski elements shown in FIGS. 1 through 4, running the length of the sled surface 26. There are at least two guiding edges 23 on the chest plate 22. The guiding edges 23 work like those on the forearm control runners 12.

The chest plate 22 is strapped to the rider's body with strapping means 25. The strapping means consist of adjustable straps 31 and 33 strap fasteners 29. There is a shoulder strap 31 and a back strap 33. The shoulder strap 31 and back strap 33 are secured by the shoulder/back strap securing means 29. The chest plate 22 is secured about the rider's waist by a waistband 44. The waistband 44 is secured by the waistband securing means 46.

A flexible apron 48 having ribs 50 running its length extends from the flat base portion 28 of the chest plate 22 to the rider's legs. Leg straps 52 secure the apron to the rider's legs. The ribs 50 add stability to the sled 10; the apron helps keep the rider dry by reducing the rider's clothing/snow contact.

The apron 48 is adjusted by apron length adjusting means 54. An end of the apron 51 is a sealed fold 49 forming a transverse channel 51 (FIG. 4). The sealed fold 49 is inserted through the base 28 of the chest plate 22 at parallel transverse body plate slots 55. A rod 53 is inserted through the transverse channel 51 in the sealed fold 49 of the apron end 51. The rod 53 has a diameter greater than the width of the parallel transverse body plate slots 55. The rod 53 fastens the apron 48 to the body chest plate 22. A plurality of parallel transverse body plate slots 55 permit the apron 48 to be adjustably positioned for different apron lengths from the rider's legs. There is a groove 56 in the body plate slot 55 inner surface for receiving the rod 53. The groove 56 allows the rod 53 to seat flushly with the inner surface of the chest plate 22. The groove 56 arrangement provides a more comfortable ride for the rider by preventing the rod 53 from pressing against the rider's chest or abdomen.

Figure 6:
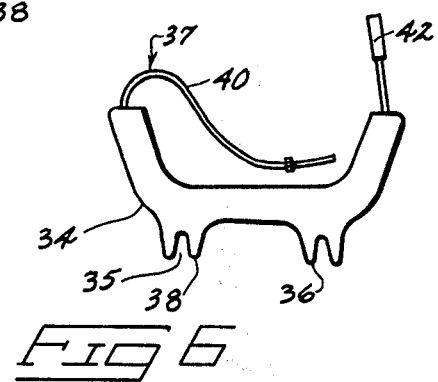
FIG. 6 is an end view of the thigh runner.

Rigid thigh runners 34 are worn on the rider's thighs. The thigh runners 34 have a sled surface 38 extending the length of the thigh. The thigh runners 34 are curved at their sides to protect the rider's thighs while he is sledding. Guiding edges 35 such as the grooved ski elements shown in FIGS. 5 and 6, run the length of the sled surface 38. The guiding edges 35 work like those on the forearm control runners 12.

The thigh runners 34 are secured to the rider's thighs by strapping means 37 consisting of thigh straps 40 and 41 and thigh strap fasteners 42. One thigh strap 40 straps over the back of the rider's upper thigh and another strap 41 straps over the back of the rider's lower thigh just above the knee.

Operation of the body sled 10 involves strapping the body sled equipment to the rider's body. The rider then takes a position at the top of the snow covered slope belly down (going from a standing position to a kneeling position to a prone position). To start descent down the slope the rider places the arm control runners in a V-shaped braking position while moving the rest of his body slightly backwards and forwards to make a slick surface under the body sled runners. When the slick surface is achieved (two or three more backward/forward movements) the rider points the arm control runner straight ahead. The weight of the rider on the slick surface starts the downhill movement.

As speed is attained, the rider may turn any direction, traversing the slope or traveling straight down the slope by merely pointing the arm control runners in the desired direction. When the rider reaches the bottom of the slope, he stands up and walks back up the hill. The rider may brake the sled by placing the arm control runners in a V-shaped or snow plow orientation or the arm control runners may be directed to the side to cause the sled to turn uphill. The rider may increase or decrease the radius of turn by moving his hips to one side or the other to direct the thigh runners in the desired direction to complement the arm control runners. The body sled is easily worn and comfortable. It could be worn while on a chairlift and used on ski runs.

The body sled is streamlined in appearance and allows a smoother ride over a rough slope. It is adjustable and made of a rigid material (such as polyethelene plastic) for a lightweight, rugged, break resistant piece of equipment without sharp, piercing corners. The body sled may be made in different sizes such as small, medium and large.

The prone position is comfortable and close to the snow surface, giving the rider a greater sense of speed and heightening the pleasure of the sledding experience. The prone position has a low center of gravity for more stability and even distribution of the rider's body weight between the legs and the chest.

The forearm control runners 12 provide a cutting effect through the snow resulting in greater stability on uneven slopes. The elongated, longitudinal guiding edges, such as the grooved ski elements 19, 23, and 35 provide straight tracking to minimize sideways sliding motion. Straight tracking aids in the amount of control the rider has while sledding. The forearm control runners 12 provide speed and direction control (braking and steering). Stress on the rider's arms is reduced because the chest plate 20 carries the rider's weight (as do the thigh runners 34).

The ribbed apron 48 tracks behind the chest plate 22 to keep the rider's abdomen and hand area dry and comfortable. The apron also improves control because the apron ribs 50 track in the snow.

As noted above, this description was given merely by way of example to set forth the preferred form of my invention. Only the following claims are to be taken as specific definitions of my invention.

I claim:

1. A body sled mountable to the forearms, chest and thighs of a rider's body, comprising:
a pair of individual, unconnected forearm control runners, one for each forearm of the rider;
means on each of the forearm control runners for releasably securing the forearm control runners respectively to the forearms of the rider;
a chest plate separate and disconnected from the forearm control runners;
means on the chest plate for releasably attaching the chest plate to the chest of the rider independently of the forearm control runners;
a pair of thigh runners separate and disconnected from one another and from the forearm control runners; and
means on each of the thigh runners for releasably securing the thigh runners respectively to the thighs of the rider for independent movement with the rider's thighs in relation to the chest plate and forearm control runners;
wherein the forearm control runners, chest plate, and thigh runners are positioned by the respective means on the rider's body to slide individually and independently over a surface such as snow or ice with the rider lying substantially in a prone position.

2. A body sled, as defined in claim 1, further comprising:
a flexible apron attached at one end to the chest plate and extending from the chest plate toward the thigh runners when mounted to the rider's body.

3. A body sled, comprising:
elongated forearm control runners to be worn on the forearms of a sled rider and having:
(a) a sled surface extending the length of the forearm;
(b) sides extending parallel to the length of the runners for turning the sled in response to exertion of upper forearm pressure by the rider;
(c) a hand grip extending upwardly from the sled surface of the forearm runners;
(d) a hand guard located in front of the hand grip perpendicular to the sled surface of the forearm runners;
a chest plate having a sled surface extending the length of the rider's torso with a flat base portion covering the rider's abdomen and a curved portion extending upward over the rider's chest;
thigh runners to be worn on the thighs of the rider and having a sled surface extending the length of the thigh;
guiding edges extending along the length of the forearm runners, chest plate and thigh runners on the sled surfaces of them;
adjustable strapping means for securing the forearm runners, the chest plate, and the thigh runners to the runner's body.

4. A body sled as defined in claim 3, further comprising:
a ribbed apron connected to the chest plate and extending rearward to the thigh runners.

5. A body sled as defined in claim 4, wherein the guiding edges comprise:
grooved ski elements.

6. A body sled as defined in claim 5, wherein the adjustable strapping means comprise:
an adjustable strap; and
a fastener for securing the adjustable strap.

7. A body sled, comprising:
forearm control runners to be worn on the forearms of a rider and having:
(a) a sled surface extending the length of the forearm;
(b) sides extending parallel to the length of the runners for turning the sled responsive to exertion of upper forearm pressure by the rider;
(c) a grooved ski element with edges extending along the sled surface of the forearm runners;
(d) a handgrip extending upwardly from the sled surface of the forearm runners;
(e) a hand guard located in front of the handgrip perpendicular to the sled surface of the forearm runners;
(f) an adjustable strap that straps across the forearm of the rider just in front of the elbow to secure the forearm runners to the rider's forearm;
(g) fastening means for securing the adjustable strap;
a chest plate having:
(a) a sled surface extending the length of the rider's torso having a flat base portion covering the rider's abdomen and a curved forward portion curved upward over the rider's chest;
(b) at least two grooved parallel ski elements with edges extending lengthwise along the sled surface of the chest plate;
(c) padded, adjustable shoulder and back straps connected to a top front section of the forward portion of the chest plate and that cross over each other across the rider's back to secure the chest plate to the rider's torso and that fasten to sides of the chest plate;
(d) fastening means for securing the shoulder and back straps to the chest plate;
(e) an adjustable, padded waistband extending about the rider's waist and connected to a side of the chest plate to secure the chest plate at the rider's waist and that fastens to an opposite side of the chest plate;
(f) fastening means for securing the waistband to the chest plate;
thigh runners to be worn on the rider's thighs and having:
(a) a sled surface extending the length of the rider's thigh;
(b) at least two grooved parallel ski elements with edges extending lengthwise along the sled surface of the thigh runners and tapering upwards at a front of the thigh runners;
(c) adjustable thigh straps connected to one side of the thigh runner at the front and a rear section of the thigh runner and extending about the rider's thigh securing the thigh runner to the rider's thigh and fastening to an opposite side of the thigh runner;
(d) one of the thigh straps strapping over the back of the rider's upper thigh;
(e) another of the thigh straps strapping over the back of the rider's thigh just above the knees;
(f) fastening means for securing the thigh straps to the thigh runner.

8. A body sled as defined in claim 7, further comprising:

an apron connected at the base portion of the chest plate and extending back from the chest plate toward the thigh runners;

the apron having parallel ribs extending lengthwise;

leg strap at a bottom end of the apron from the chest plate for securing the bottom end of the apron to the rider's legs.

9. A body sled as defined in claim 8, wherein the body sled includes an apron length adjusting means comprising:

the body plate having parallel transverse slots at the base portion of the body plate;

the apron having a sealed fold at a top end forming a transverse channel;

the sealed fold of the apron being receivable within the slots;

a rod receivable within the transverse channel of the apron fold and having a larger outside dimension than that of the slot, said rod for securing the apron within the slot when received in the transverse channel;

a groove within an inner surface of the slot for receiving the rod and apron flush with the inner surface of the chest plate.

10. A body sled as defined in claim 9, wherein the chest plate further comprises:

padding on an inner surface.

* * * * *